(12) United States Patent
Yen

(10) Patent No.: US 11,449,983 B2
(45) Date of Patent: Sep. 20, 2022

(54) DEFECT IDENTIFICATION METHOD AND IMAGE ANALYSIS SYSTEM

(71) Applicant: Powerchip Semiconductor Manufacturing Corporation, Hsinchu (TW)

(72) Inventor: Yue-Ying Yen, Hsinchu County (TW)

(73) Assignee: Powerchip Semiconductor Manufacturing Corporation, Hsinchu (TW)

( * ) Notice: Subject to any disclaimer, the term of this patent is extended or adjusted under 35 U.S.C. 154(b) by 182 days.

(21) Appl. No.: 16/993,294

(22) Filed: Aug. 14, 2020

(65) Prior Publication Data

US 2022/0005170 A1 Jan. 6, 2022

(30) Foreign Application Priority Data

Jul. 1, 2020 (TW) ................................ 109122218

(51) Int. Cl.
*G06T 7/00* (2017.01)
*G06V 10/25* (2022.01)

(52) U.S. Cl.
CPC .............. *G06T 7/001* (2013.01); *G06V 10/25* (2022.01); *G06T 2207/30148* (2013.01); *G06T 2207/30168* (2013.01)

(58) Field of Classification Search
CPC ........... G06T 7/001; G06T 2207/30148; G06T 2207/30168; G06T 2207/10061; G06V 10/25

(Continued)

(56) References Cited

U.S. PATENT DOCUMENTS 5,963,662 A * 10/1999 Vachtsevanos ....... G06T 7/0006
374/10
6,169,282 B1 * 1/2001 Maeda .................... G06T 7/001
250/307

(Continued)

FOREIGN PATENT DOCUMENTS

CN 110942444 3/2020
JP 2003058879 2/2003

(Continued)

OTHER PUBLICATIONS

"Office Action of Taiwan Counterpart Application", dated Mar. 4, 2021, pp. 1-3.

*Primary Examiner* — Sheela C Chawan
(74) *Attorney, Agent, or Firm* — JCIPRNET

(57) ABSTRACT

A defect identification method and an image analysis system are provided. The defect identification method includes the following steps: adjusting a gray level distribution of a first image corresponding to a reference image of a defect on a wafer to generate a second image; capturing a defect of interest image in the second image; analyzing a plurality of pixels of the defect of interest image to obtain a minimum gray level value of the pixels; analyzing the pixels of the second image according to the minimum gray level value, so as to obtain a number of defect of interest pixels and a number of non-defect of interest pixels; dividing the number of defect of interest pixels by the number of non-defect of interest pixels to obtain a proportional value; and determining a defect type of the defect in the first image according to the proportional value.

18 Claims, 8 Drawing Sheets

(58) Field of Classification Search
USPC ....... 382/100, 141, 145, 149, 144, 147, 168, 382/169, 172, 254, 256, 257, 276, 305, 382/274, 270, 272, 209, 217, 150, 181, 382/190, 195, 199; 348/86, 61, 125, 126; 356/394, 237.1, 237.2, 237.5
See application file for complete search history.

(56) References Cited

U.S. PATENT DOCUMENTS

| | | | | |
|---|---|---|---|---|
| 7,804,993 | B2* | 9/2010 | Dorphan | G01N 21/9501 382/254 |
| 8,165,384 | B1* | 4/2012 | Ma | G03F 1/70 382/238 |
| 8,451,209 | B2* | 5/2013 | Sugino | G09G 3/342 725/38 |
| 10,483,081 | B2* | 11/2019 | Park | G03F 7/70625 |
| 2004/0086168 | A1* | 5/2004 | Kuwabara | G06T 7/001 382/145 |
| 2008/0112608 | A1* | 5/2008 | Yang | G06T 7/001 382/149 |
| 2009/0037134 | A1* | 2/2009 | Kulkarni | G01N 21/9501 702/127 |
| 2009/0238445 | A1* | 9/2009 | Yang | G06T 7/0004 382/149 |
| 2014/0232849 | A1* | 8/2014 | Ogawa | G06T 7/0004 348/87 |
| 2020/0134810 | A1* | 4/2020 | Lee | G06T 7/0004 |

FOREIGN PATENT DOCUMENTS

| | | |
|---|---|---|
| TW | 388842 | 5/2000 |
| TW | 201702586 | 1/2017 |
| TW | M585899 | 11/2019 |

* cited by examiner

DEFECT IDENTIFICATION METHOD AND IMAGE ANALYSIS SYSTEM

CROSS-REFERENCE TO RELATED APPLICATION

This application claims the priority benefit of Taiwan application serial no. 109122218, filed on Jul. 1, 2020. The entirety of the above-mentioned patent application is hereby incorporated by reference herein and made a part of this specification.

BACKGROUND

Technical Field

The disclosure relates to a classification method and an analysis system, and particularly relates to a defect identification method and an image analysis system.

Description of Related Art

Regarding wafer inspection that generally analyzes structural defects on a surface of a wafer through images, an inspector needs to perform a large amount of defect shape analysis and calculations on the images with the structural defects in order to effectively identify and classify different defect types. For example, regarding a wafer prepared with a plurality of dies of static random access memory (SRAM), the structure of each transistor of the SRAM with 6 transistors (6T SRAM) in the vertical direction and the horizontal direction of the wafer has a mirror structure relationship. In other words, in a general defect identification and classification method, defect images of electronic components with the mirror structure relationship must be analyzed and determined for multiple times in order to avoid identifying or classifying defects with different defect images but actually belonging to the same electronic component (due to the mirror structure relationship) to different defect types. Therefore, the general defect identification and classification method has a disadvantage of requiring significant computational costs and time. Moreover, defect images provided by general wafer inspection equipment usually have a serious color aberration problem, which may cause serious errors in results of the defect shape analysis and calculations. Therefore, solutions of several embodiments are proposed below to provide a method for accurately and quickly identifying and classifying the structural defects generated during a manufacturing process of the wafer.

SUMMARY

The disclosure is directed to a defect identification method and an image analysis system, which are capable of determining defects on a wafer.

The disclosure provides a defect identification method includes following steps. A gray level distribution of a first image corresponding to a reference image of a defect on a wafer is adjusted to generate a second image. A defect of interest image in the second image is captured. A plurality of pixels of the defect of interest image are analyzed to obtain a minimum gray level value of the pixels. A plurality of pixels of the second image are analyzed according to the minimum gray level value to obtain a number of defect of interest pixels and a number of non-defect of interest pixels. The number of defect of interest pixels is divided by the number of non-defect of interest pixels to obtain a proportional value. A defect type of the defect in the first image is determined according to the proportional value.

The disclosure provides an image analysis system including a memory and a processor. The memory is configured to store a plurality of modules. The processor is coupled to the memory. The processor is configured to read and execute the modules to perform following operations. The processor adjusts a gray level distribution of a first image corresponding to a reference image of a defect on a wafer to generate a second image. The processor captures a defect of interest image in the second image. The processor analyzes a plurality of pixels of the defect of interest image to obtain a minimum gray level value of the pixels. The processor analyzes a plurality of pixels of the second image according to the minimum gray level value to obtain a number of defect of interest pixels and a number of non-defect of interest pixels. The processor divides the number of defect of interest pixels by the number of non-defect of interest pixels to obtain a proportional value. The processor determines a defect type of the defect in the first image according to the proportional value.

Based on the above description, the defect identification method and the image analysis system provided by the disclosure are capable of performing image processing and image analysis on the image corresponding to the defect on the wafer to effectively determine the defect type of the defect.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
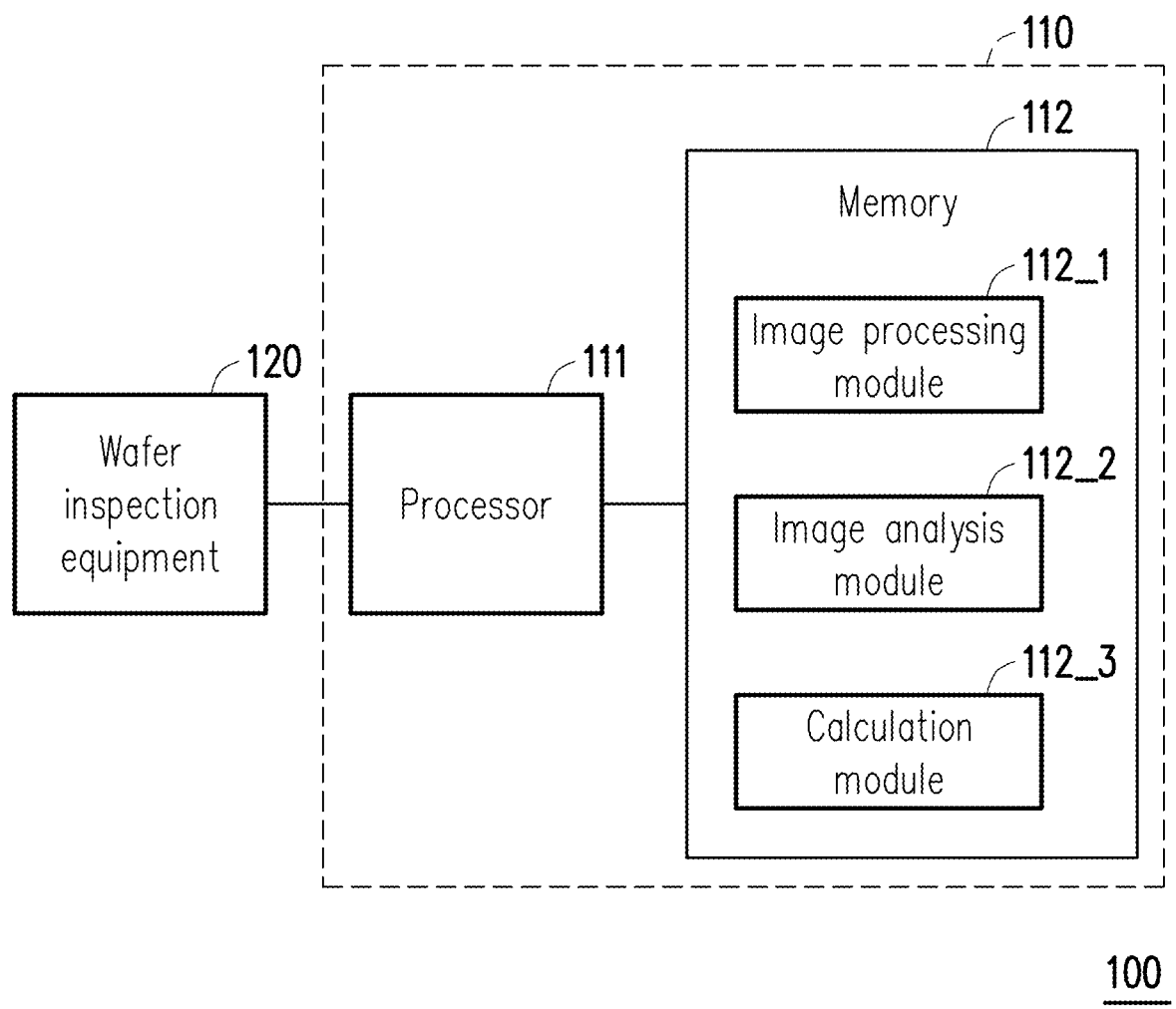
FIG. 1 is a schematic diagram of an image analysis system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic diagram of an image analysis system according to an embodiment of the disclosure. Referring to FIG. 1, an image analysis system 100 includes an electronic apparatus 110 and wafer inspection equipment 120. The electronic apparatus 110 is coupled to the wafer inspection equipment 120 and includes a processor 111 and a memory 112. The processor 111 is coupled to a memory 112, and the memory 112 stores a plurality of modules including an image processing module 122_1, an image analysis module 122_2, and a calculation module 122_3. In the embodiment, the electronic apparatus 110 may be, for example, a computer apparatus, and the wafer inspection equipment 120 may be optical inspection equipment. In an embodiment, the wafer inspection equipment 120 may be a scanning electron microscope (SEM) or optical inspection instrument and may obtain a plurality of reference images, where the reference images may be a plurality of patch images, and the reference images are respectively gray level images. In addition, in an embodiment, the electronic apparatus 110 and the wafer inspection equipment 120 may also be integrated into a single inspection apparatus.

In the embodiment, the wafer inspection equipment 120 may perform wafer inspection on a wafer to obtain a plurality of reference images of a plurality of regional surfaces of the wafer, and provide the reference images to the electronic apparatus 110 to perform image processing and analysis. The wafer may, for example, include a plurality of memory dies. In an embodiment, the wafer may include a plurality of static random access memory (SRAM) dies, but inspection objects of the disclosure are not limited thereto. In the embodiment, the wafer inspection equipment 120 may first determine whether a wafer surface of the wafer has structural defects during a semiconductor manufacturing process according to the reference images, so as to provide the reference images of the defective parts to the electronic apparatus 110, where the structural defects include physical defects and voltage contrast defects. It should be noted that the wafer inspection equipment 120 may, for example, compare the reference images with the reference image one-by-one in gray level values, and take the reference images with abnormal gray level values as corresponding to the defective parts in the wafer.

In the embodiment, the processor 111 may read and execute the image processing module 112_1, the image analysis module 112_2, and the calculation module 112_3 to perform image processing and analysis on the reference image corresponding to the defective part in the wafer, so as to identify a defect type of the defect in the reference image. Moreover, in an embodiment, the electronic apparatus 110 may further perform grouping analysis on identification results of a plurality of defect types of a plurality of defects identified from a plurality of the reference images corresponding to the defective parts in the wafer, so as to establish corresponding grouping information corresponding to the defect types. However, the processor 111 of the disclosure is not limited to execute the aforementioned modules. In an embodiment, the processor 111 may also implement the aforementioned image processing and analysis by executing related programs or through corresponding hardware circuits.

In the embodiment, the processor 111 may be a graphics processing unit (GPU), an image signal processor (ISP), a central processing unit (CPU), or other programmable general-purpose or special-purpose microprocessor, a digital signal processor (DSP), a programmable controller, application specific integrated circuits (ASIC), a programmable logic device (PLD), other similar processors or a combination of the processor circuits. The memory 112 may be used to store images and a plurality of modules or software for the processor 111 to access and execute, so as to implement the related methods and the defect identification method described in the embodiments of the disclosure.

Figure 2:
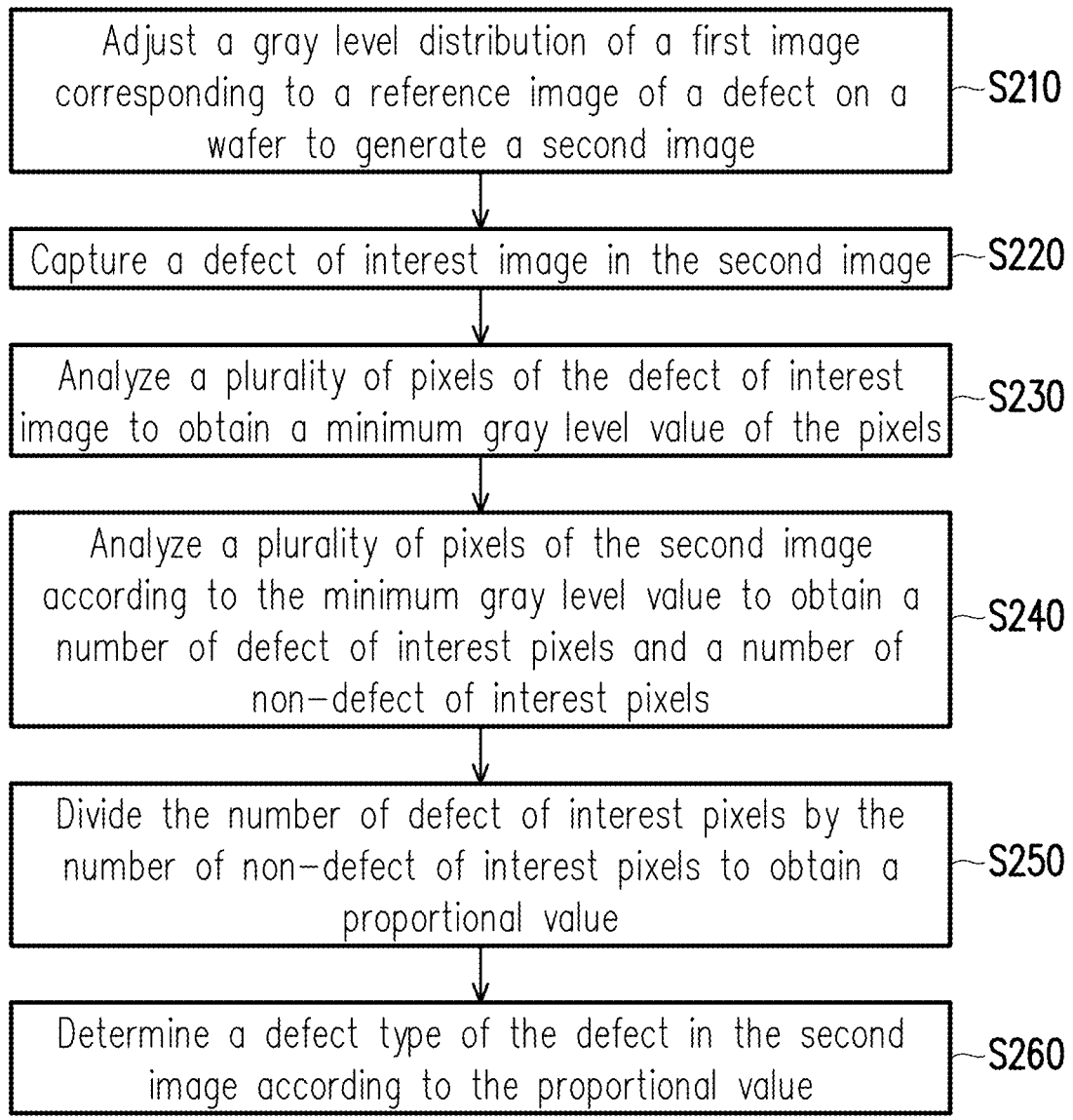
FIG. 2 is a flow chart illustrating a defect identification method according to an embodiment of the disclosure.
Figure 3:
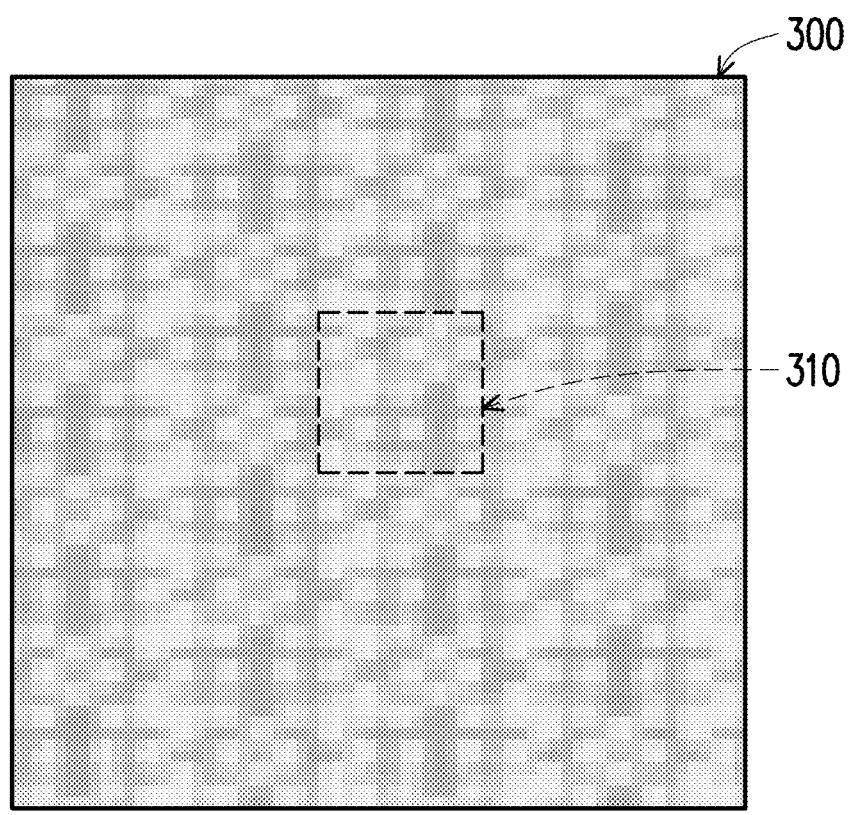
FIG. 3 is a schematic diagram of a reference image according to an embodiment of the disclosure.

FIG. 2 is a flow chart illustrating a defect identification method according to an embodiment of the disclosure. Referring to FIG. 1 and FIG. 2, the image analysis system 100 may first perform wafer inspection on a wafer by using the wafer inspection equipment 120. FIG. 3 is a schematic diagram of a reference image according to an embodiment of the disclosure. Referring to FIG. 3, the electronic apparatus 110 may obtain a reference image 300 of FIG. 3 determined to be provided with a defect by the wafer inspection equipment 120 during the wafer inspection process of the wafer. In the embodiment, the wafer inspection equipment 120 may, for example, compare the reference image 300 with a reference image in gray level values, and determine a gray level value difference between the reference image 300 and the reference image, so that the reference image 300 is taken as an image corresponding to a defective part of the wafer. It should be noted that the wafer inspection equipment 120 may, for example, compare that the reference image 300 and the reference image have a gray level value difference within a range of an image processing range 310. Therefore, the wafer inspection equipment 120 may report the reference image 300 and range information of the image processing range 310 with the gray level value difference to the electronic apparatus 110.

Figure 4A:
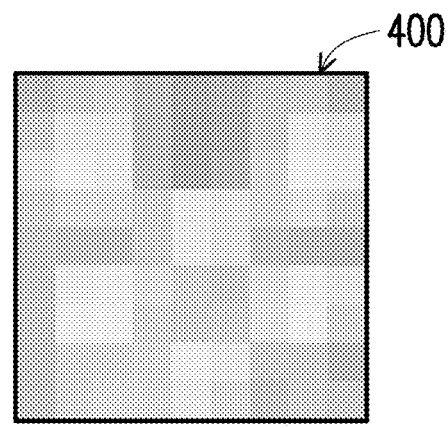
FIG. 4A is a schematic diagram of a first image according to an embodiment of the disclosure.
Figure 4B:
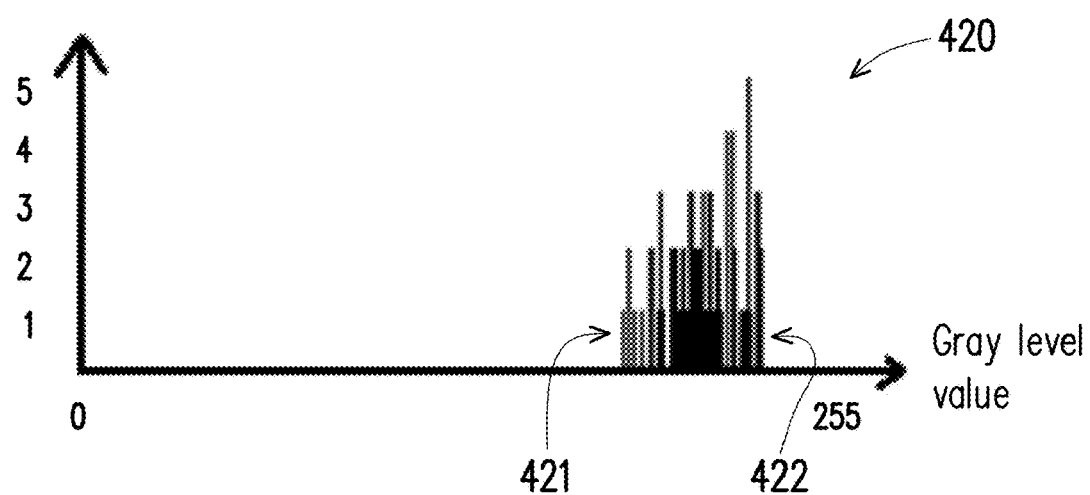
FIG. 4B is a diagram of a gray level distribution of the first image according to the embodiment of FIG. 4A.
Figure 5A:
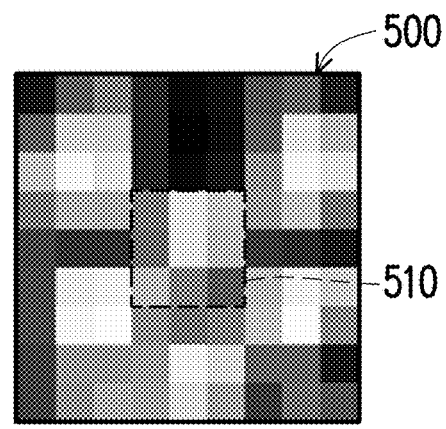
FIG. 5A is a schematic diagram of a second image according to an embodiment of the disclosure.
Figure 5B:
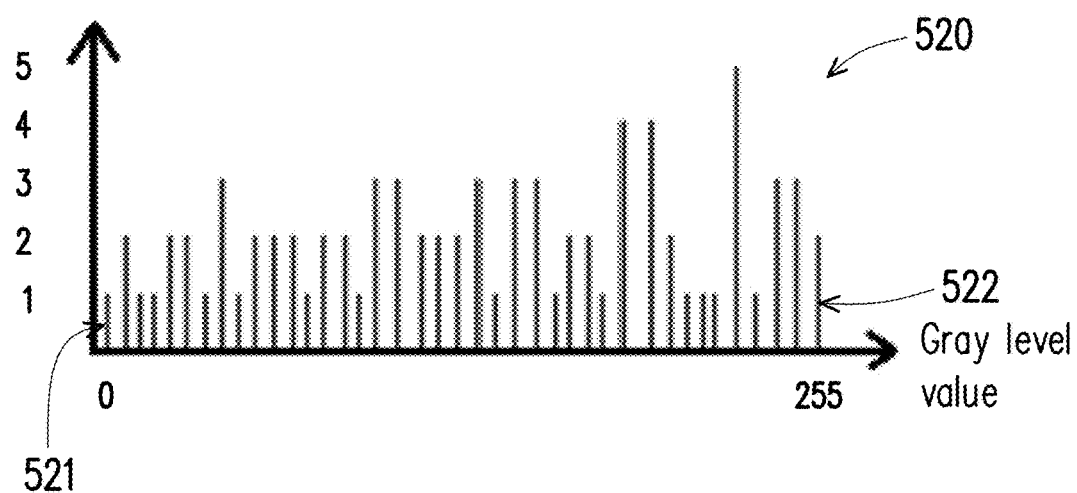
FIG. 5B is a diagram of a gray level distribution of the second image according to the embodiment of FIG. 5A.

FIG. 4A is a schematic diagram of a first image according to an embodiment of the disclosure. FIG. 4B is a diagram of a gray level distribution of the first image according to the embodiment of FIG. 4A. Referring to FIG. 4A and FIG. 4B, the electronic apparatus 110 may define the image processing range 310 in the reference image 300 to obtain a first image 400 corresponding to the image processing range 310. A pixel size of the first image 400 (the pixel size is, for example, 9×9) is less than a pixel size of the reference image 300 (the pixel size is, for example, 64×64). The first image 400 may have a gray level distribution 420 as shown in FIG. 4B. Then, the electronic apparatus 110 may perform steps S210-S260 to identify a defect type of a defect in the first image 400. FIG. 5A is a schematic diagram of a second image according to an embodiment of the disclosure. FIG. 5B is a diagram of a gray level distribution of the second image according to the embodiment of FIG. 5A. Referring to FIG. 5A and FIG. 5B, in step S210, the processor 111 adjusts the gray level distribution of the first image 400 corresponding to the defect to generate a second image 500 shown in FIG. 5A. The second image 500 may have a gray level distribution 520 shown in FIG. 5B. In the embodiment, the processor 111 may, for example, execute the image processing module 122_1 to adjust a gray level value of each pixel of the first image 400 having the gray level distribution 420 to generate the second image 500 having the gray level distribution 520. It should be noted that a minimum gray level value 421 in the gray level distribution 420 is greater than a minimum gray level value 521 in the gray level distribution 520, and a maximum gray level value 422 in the gray level distribution 420 is less than a maximum gray level value 522 in the gray level distribution 520. In other words, the processor 111 of the embodiment may adjust a display result of the first image 400 with less obvious gray level difference to a display result of the second image 500 with obvious gray level difference, so that the second image 500 may clearly display surface characteristics of the wafer to avoid subsequent identification errors caused by color difference.

It should be noted that referring to FIG. 4A, during the process of comparing the reference image 300 with the reference image, the wafer inspection equipment 120 may further indicate a position of the gray level value difference in the range of the image processing range 310. Moreover, the wafer inspection equipment 120 may also report the position information of the image processing range 310 with the gray level value difference to the electronic apparatus 110. Therefore, in step S220, the processor 111 determines a position and a range of a defect of interest (DOI) image 510 according to the position information reported by the wafer inspection equipment 120, so as to capture the DOI image 510 in the second image 500. A pixel size of the DOI image 510 is less than a pixel size of the second image 500.

Figure 6A:
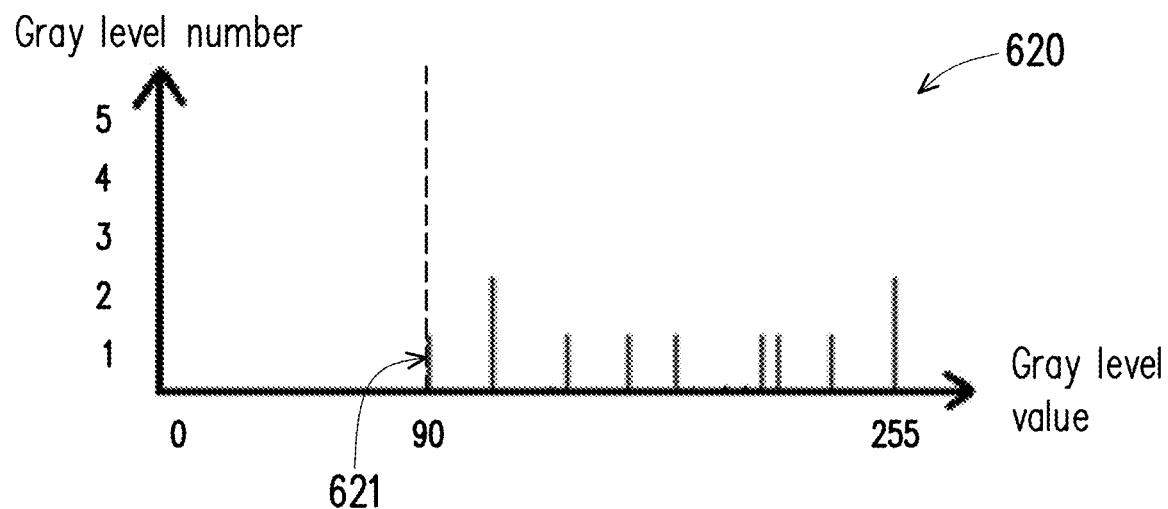
FIG. 6A is a diagram of a gray level distribution of a defect of interest (DOI) image according to the embodiment of FIG. 5A.

In step S230, the processor 111 analyzes a plurality of pixels of the DOI image 510 to obtain a minimum gray level value of the pixels. In the embodiment, the processor 111 may, for example, execute the image analysis module 122_2 to analyze the DOI image 510 and obtain a pixel value of each pixel in the DOI image 510. Referring to FIG. 6A, FIG. 6A is a diagram of a gray level distribution of the DOI image according to the embodiment of FIG. 5A. For example, the pixel size of the DOI image 510 is 3×3, so that the processor 111 may obtain nine gray level values of nine pixels of the DOI image 510. As shown in a gray level distribution 620 of FIG. 6A, the processor 111 may obtain a minimum gray level value 621 of the DOI image 510 as 90 (as indicated by dotted line in FIG. 6A).

Figure 6B:
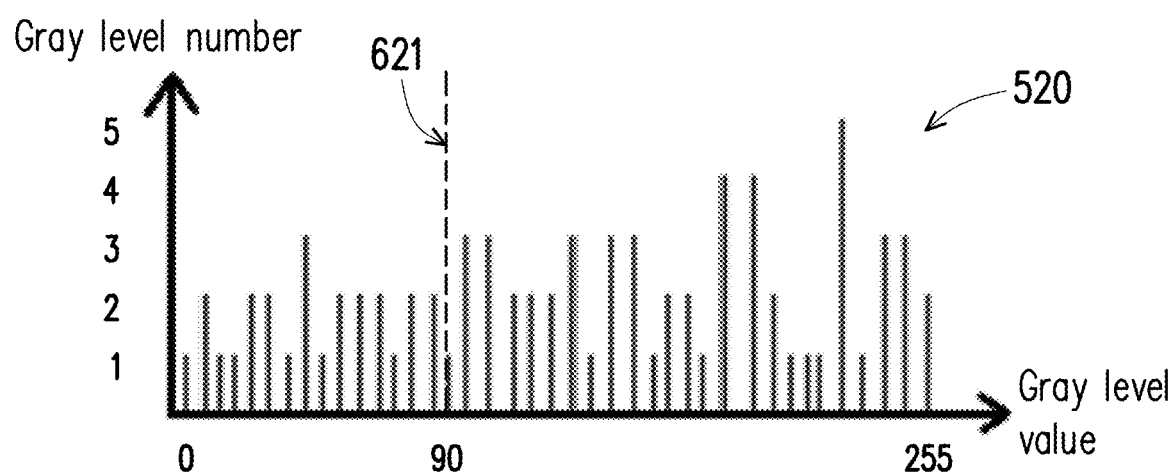
FIG. 6B is a diagram of a gray level distribution of the second image according to the embodiment of FIG. 5A.

Referring to FIG. 6B, FIG. 6B is a diagram of a gray level distribution of the second image according to the embodiment of FIG. 5A. In step S240, the processor 111 analyzes a plurality of pixels of the second image 500 according to the minimum gray level value (the gray level value=90) 621 to obtain a number of DOI pixels and a number of non-DOI pixels. In the embodiment, the processor 111 may, for example, execute the image analysis module 122_2 to classify the gray level distribution 520 of the second image 500 according to the minimum gray level value (the gray level value=90). For example, the processor 111 may calculate the number (for example, 56) of pixels with gray level values greater than or equal to the minimum gray level value (the gray level values≥90) among the pixels of the gray scale distribution 520 of the second image 500 to act as the number of the DOI pixels, and calculate the number of pixels with gray level values less than the minimum gray level value (the gray level values<90) among the pixels of the gray scale distribution 520 of the second image 500 to act as the number of the non-DOI pixels (for example, 25). It should be noted that the aforementioned DOI pixels may correspond to regions of structural contacts or a metal layer of the electronic component presented on the wafer surface, and the aforementioned non-DOI pixels may correspond to regions other than the structural contacts of the electronic component presented on the wafer surface, such as an oxide layer region.

In step S250, the processor 111 divides the number of the DOI pixels by the number of the non-DOI pixels to obtain a proportional value. In the embodiment, the processor 111 may, for example, execute the calculation module 112_3 to perform a value calculation, and the proportional value of the number of the DOI pixels divided by the number of the non-DOI pixels may be, for example, 2.24 (56/25=2.24). Therefore, the above proportional value is actually a grey level counts ratio, which may represent a ratio of a contact layer (or metal layer) of the electronic component to the oxide layer.

In step S260, the processor 111 determines a defect type of the defect corresponding to the second image 500 according to the proportional value. For example, the aforementioned wafer may include a plurality of SRAM dies, so that the aforementioned defect may refer to, for example, a bit line structure, a word line, a share contact structure, an inverter transmitting terminal (Q, Q bar) structure, a ground (Vss) terminal structure, an operating voltage (Vdd) terminal structure corresponding to the SRAM or other parts having a structural defect and having a specific relative position relationship or a specific ratio relationship between a metal material and the oxide layer. Referring to a following table 1, since the bit line structure, the word line, the share contact structure, the inverter transmitting terminal structure, the ground terminal structure, and the operating voltage terminal structure may be respectively composed of different amounts of N-type metal oxide semiconductor field effect transistors (MOSFET) and different amounts of P-type MOSFET, contact layers (or metal layers) and the oxide layer respectively presented on the wafer surface by the aforementioned structure types (defect types) have different and specific proportional relationships. Therefore, the processor 111 of the embodiment may effectively determine the defect type of the defect in the first image 400 according to the aforementioned obtained proportional value.

TABLE 1

| Position (defect type) | Proportional value (grey level counts ratio) |
| --- | --- |
| Bit line 1 | 2.24 |
| Bit line 2 | 3 |
| Word line 1 | 0.42 |
| Word line 2 | 0.43 |
| Share contact 1 | 1.45 |
| Share contact 2 | 1.5 |
| Inverter transmitting terminal 1 | 1.19 |
| Inverter transmitting terminal 2 | 1.23 |
| Ground terminal 1 | 0.29 |
| Ground terminal 2 | 0.31 |
| Operating voltage terminal 1 | 0.61 |
| Operating voltage terminal 2 | 0.675 |

Figure 7:
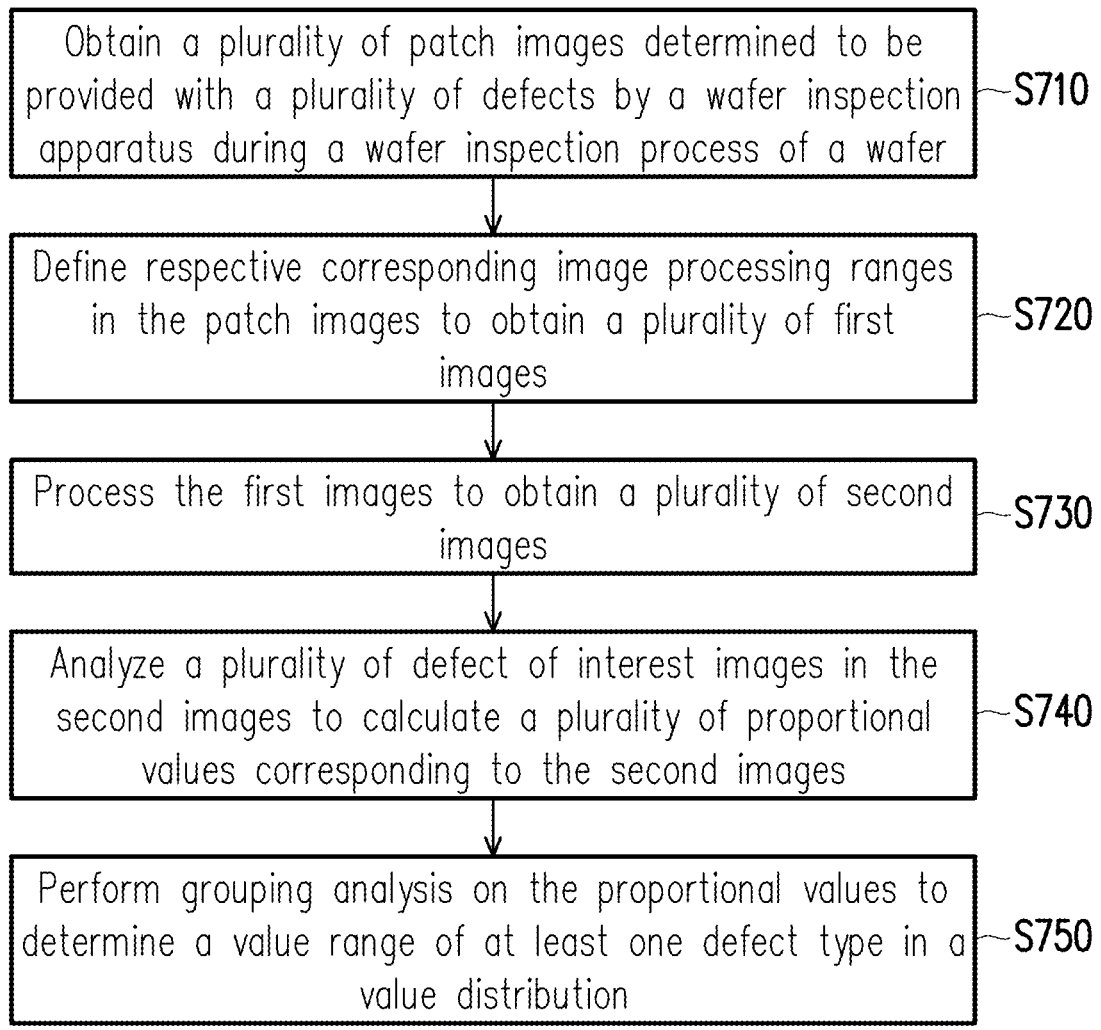
FIG. 7 is a flow chart illustrating a defect classification method according to an embodiment of the disclosure.

FIG. 7 is a flow chart illustrating a defect classification method according to an embodiment of the disclosure. Referring to FIG. 1 and FIG. 7, the image analysis system 100 may perform statistics on and group a plurality of defects identified by the wafer inspection equipment 120 during the wafer inspection process of the wafer. It should be noted that as shown in the table 1, since the proportional values of the defects belonging to the same structure type (defect type) but locating at different positions are slightly different, for example, the bit line 1 and the bit line 2 in the above Table 1 represent calculation results of the proportional values performed by the processor 111 on different bit line structures obtained from different positions. Therefore, in the embodiment, the electronic apparatus 110 may execute following steps S710-S740 to implement defect classification. In step S710, the processor 111 obtains a plurality of reference images (similar to the reference image 300 of FIG. 3) determined to be provided with a plurality of defects by the wafer inspection equipment 120 during the wafer inspection process of the wafer. In step S720, the processor 111 defines respective corresponding image processing ranges in the reference images to obtain a plurality of first images (similar to the first image 400 of FIG. 4A). In step S720, the processor 111 analyzes the first images to obtain a plurality of proportional values corresponding to the first images. In step S730, the processor 111 processes the first images to obtain a plurality of second images (similar to the second image 500 of FIG. 5A). In step S740, the processor 111 analyzes a plurality of DOI images (similar to the DOI image 510 of FIG. 5A) in the second images to calculate a plurality of proportional values corresponding to the second images. In step S750, the processor 111 performs grouping analysis on the proportional values to determine a value range of at least one defect type in a value distribution.

Figure 8A:
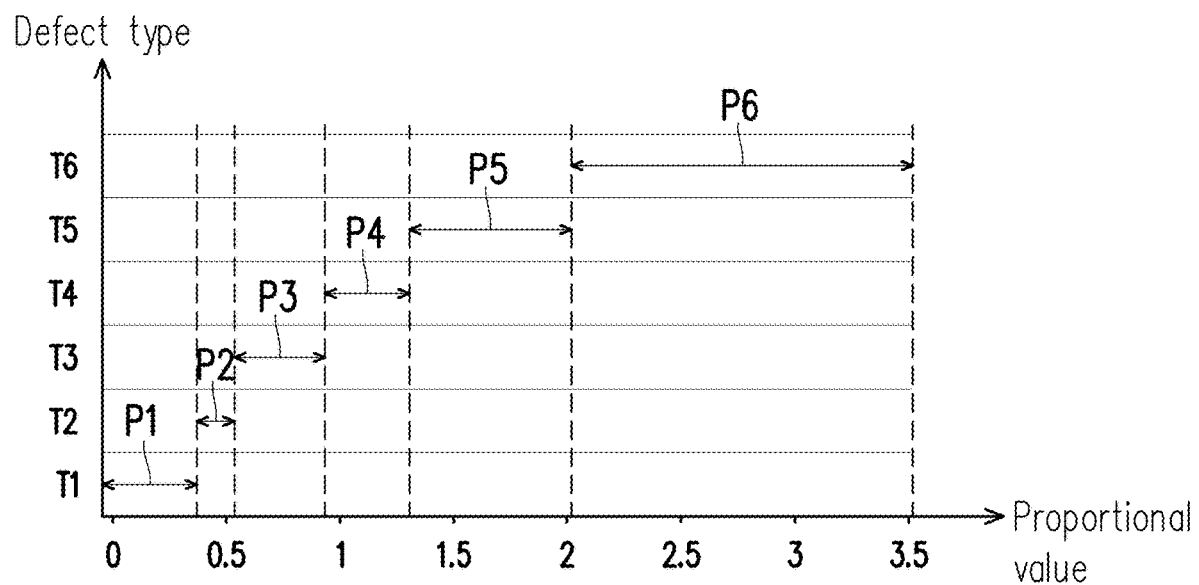
FIG. 8A is a schematic diagram of value distributions of a plurality of defect types according to an embodiment of the disclosure.

Referring to FIG. 8A, FIG. 8A is a schematic diagram of value distributions of a plurality of defect types according to an embodiment of the disclosure. The proportional values may be located in respective corresponding value ranges P1-P6 of FIG. 8A. In the embodiment, the processor 111 may, for example, perform statistics on the proportional values of different defect types T1-T6. Continuing the above exemplary example, the defect types T1-T6 may, for example correspond to various electronic component structures of SRAM. The defect type T1 may be, for example, the bit line structure. The defect type T2 may be, for example, the share contact structure. The defect type T3 may be, for example, the inverter transmitting terminal structure. The defect type T4 may be, for example, the operating voltage terminal structure. The defect type T5 may be, for example, the word line structure. The defect type T6 may be, for example, the ground terminal structure. Namely, since the proportional values of the same defect type are in the same corresponding value range, the processor 111 may accurately classify a plurality of defects probably corresponding to a plurality of defect types according to the proportional values, and establish grouping information corresponding to the defect types. The processor 111 may relatively define or mark positions of a plurality of the defects probably corresponding to the different defect types on the wafer.

Figure 8B:
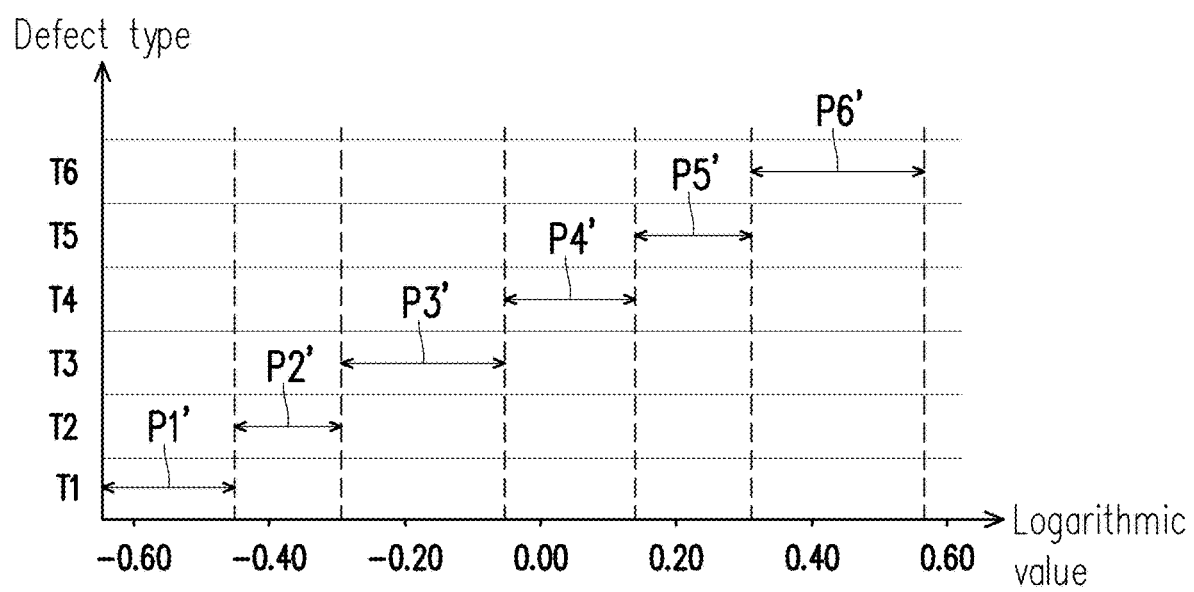
FIG. 8B is a schematic diagram of value distributions of a plurality of defect types according to another embodiment of the disclosure.

However, in an embodiment, the processor 111 may further logarithmize the proportional values counted in FIG. 8A to obtain a plurality of logarithmic values. The processor 111 may group the logarithmic values to determine a value range of at least one defect type in value distributions of the logarithmic values. Referring to FIG. 8B, FIG. 8B is a schematic diagram of value distributions of a plurality of defect types according to another embodiment of the disclosure. After the proportional values counted in FIG. 8A are logarithmized, a value distribution result of FIG. 8B is generated. The logarithmic values may be respectively located in respective corresponding value ranges P1'-P6' of FIG. 8B. By comparing FIG. 8A and FIG. 8B, it is known that range sizes of the value ranges P1'-P6' after logarithm conversion may be more even compared with that of FIG. 8A, which may facilitate the user to define boundaries of the value range P1'-P6' to reduce classification errors. For example, referring to a following table 2, the value ranges P1'-P6' of each defect type in FIG. 8B may, for example, have the following value boundary relationships.

TABLE 2

| Position (defect type) | Value range |
|---|---|
| Bit line | <−0.46 |
| Word line | −0.46 to −0.3 |

TABLE 2-continued

| Position (defect type) | Value range |
|---|---|
| Share contact | −0.3 to −0.07 |
| Inverter transmitting terminal | −0.07 to 0.12 |
| Ground terminal | 0.12 to 0.26 |
| Operating voltage terminal | >0.26 |

Therefore, the processor 111 of the embodiment may provide grouping information as shown in FIG. 8B that facilitates an inspector to perform relevant judgment or subsequent processing and analysis. Moreover, regarding detailed implementations of various steps of the embodiments of FIG. 7 to FIG. 8B, reference may be made to the description of the aforementioned embodiments of FIG. 1 to FIG. 6 for sufficient instructions, suggestions, and implementation descriptions, which are not repeated.

In view of the foregoing, the defect identification method and the image analysis system of the disclosure may perform image processing for adjusting the gray level distribution on the reference image (gray level image) having a defect provided by the wafer inspection equipment to enhance the characteristics of the reference image, and determine the number of DOI pixels and the number of non-DOI pixels in the processed reference image to obtain the grey level counts ratio. Therefore, the defect identification method and the image analysis system of the disclosure may accurately identify the defect type of the defect according to the gray scale counts ratio. Moreover, the defect identification method and the image analysis system of the disclosure may also provide an effective defect classification method to accurately classify a plurality of defects probably corresponding to a plurality of defect types, and establish grouping information corresponding to the defect types.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:
1. A defect identification method, comprising:
adjusting a gray level distribution of a first image corresponding to a reference image of a defect on a wafer to generate a second image;
capturing a defect of interest image in the second image;
analyzing a plurality of pixels of the defect of interest image to obtain a minimum gray level value of the pixels;
analyzing a plurality of pixels of the second image according to the minimum gray level value to obtain a number of defect of interest pixels and a number of non-defect of interest pixels;
dividing the number of defect of interest pixels by the number of non-defect of interest pixels to obtain a proportional value; and
determining a defect type of the defect in the second image according to the proportional value,
wherein the step of analyzing the plurality of pixels of the second image according to the minimum gray level value to obtain the number of defect of interest pixels and the number of non-defect of interest pixels comprises:

calculating a number of pixels with gray level values greater than or equal to the minimum gray level value to act as the number of defect of interest pixels; and calculating a number of pixels with gray level values less than the minimum gray level value to act as the number of non-defect of interest pixels.

2. The defect identification method according to claim 1, wherein the step of adjusting the gray level distribution of the first image corresponding to the reference image of the defect on the wafer to generate the second image comprises:

adjusting a plurality of gray level values of a plurality of pixels of the first image with a first gray level distribution to generate the second image with a second gray level distribution, wherein a first minimum gray level value in the first gray level distribution is greater than a second minimum gray level value in the second gray level distribution, and a first maximum gray level value in the first gray level distribution is less than a second maximum gray level value in the second gray level distribution.

3. The defect identification method according to claim 1, wherein the step of capturing the defect of interest image in the second image comprises:

defining a range of interest in the second image to obtain the defect of interest image corresponding to the range of interest, wherein the range of interest is determined based on the defect type.

4. The defect identification method according to claim 1, wherein a pixel size of the defect of interest image is less than a pixel size of the second image.

5. The defect identification method according to claim 1, further comprising:

obtaining the reference image determined to be provided with the defect by wafer inspection equipment during a wafer inspection process of the wafer; and defining an image processing range of the detect in the reference image to obtain the first image corresponding to the image processing range.

6. The defect identification method according to claim 5, wherein a pixel size of the first image is less than a pixel size of the reference image.

7. The defect identification method according to claim 5, further comprising:

obtaining a plurality of reference images determined to be provided with a plurality of defects by the wafer inspection equipment during the wafer inspection process of the wafer;

defining a respective corresponding image processing range in each of the reference images to obtain a plurality of first images;

processing the first images to obtain a plurality of second images;

analyzing a plurality of defect of interest images in the second images to calculate a plurality of proportional values corresponding to the second images; and performing grouping analysis on the proportional values to determine a value range of at least one defect type in a value distribution.

8. The defect identification method according to claim 7, wherein the step of performing the grouping analysis on the proportional values to determine the value range of the at least one defect type in the value distribution comprises:

logarithmizing the proportional values to obtain a plurality of logarithmic values; and grouping the logarithmic values to determine the value range of the at least one defect type in the value distribution of the logarithmic values.

9. The defect identification method according to claim 5, wherein the wafer inspection equipment is a scanning electron microscope or an optical inspection instrument, and the reference image is a gray level image.

10. An image analysis system, comprising:

a memory; and a processor, coupled to the memory, configured to perform following operations, wherein the processor adjusts a gray level distribution of a first image corresponding to a reference image of a defect on a wafer to generate a second image, and the processor captures a defect of interest image in the second image, wherein the processor analyzes a plurality of pixels of the defect of interest image to obtain a minimum gray level value of the pixels, and the processor analyzes a plurality of pixels of the second image according to the minimum gray level value to obtain a number of defect of interest pixels and a number of non-defect of interest pixels, wherein the processor divides the number of defect of interest pixels by the number of non-defect of interest pixels to obtain a proportional value, and the processor determines a defect type of the defect in the first image according to the proportional value, wherein the processor calculates a number of pixels with gray level values greater than or equal to the minimum gray level value to act as the number of defect of interest pixels, and the processor calculates a number of pixels with gray level values less than the minimum gray level value to act as the number of non-defect of interest pixels.

11. The image analysis system according to claim 10, wherein the processor adjusts a plurality of gray level values of a plurality of pixels of the first image with a first gray level distribution to generate the second image with a second gray level distribution, wherein a first minimum gray level value in the first gray level distribution is greater than a second minimum gray level value in the second gray level distribution, and a first maximum gray level value in the first gray level distribution is less than a second maximum gray level value in the second gray level distribution.

12. The image analysis system according to claim 10, wherein the processor defines a range of interest in the second image to obtain the defect of interest image corresponding to the range of interest, wherein the range of interest is determined based on the defect type.

13. The image analysis system according to claim 10, wherein a pixel size of the defect of interest image is less than a pixel size of the second image.

14. The image analysis system according to claim 10, further comprising:

wafer inspection equipment, coupled to the processor, configured to perform wafer inspection on the wafer, wherein the processor obtains the reference image determined to be provided with the defect by the wafer inspection equipment during a wafer inspection process of the wafer, and the processor defines an image processing range in the reference image to obtain the first image corresponding to the image processing range.

15. The image analysis system according to claim 14, wherein a pixel size of the first image is less than a pixel size of the reference image.

16. The image analysis system according to claim 14, wherein the processor obtains a plurality of reference images determined to be provided with a plurality of defects by the wafer inspection equipment during the wafer inspection process of the wafer, and the processor define a respective corresponding image processing range in each of the reference images to obtain a plurality of first images,
  wherein the processor processes the first images to obtain a plurality of second images, and the processor analyzes a plurality of defect of interest images in the second images to calculate a plurality of proportional values corresponding to the second images,
  wherein the processor performs grouping analysis on the proportional values to determine a value range of at least one defect type in a value distribution.

17. The image analysis system according to claim 16, wherein the processor logarithmizes the proportional values to obtain a plurality of logarithmic values, and the processor groups the logarithmic values to determine the value range of the at least one defect type in the value distribution of the logarithmic values.

18. The image analysis system according to claim 14, wherein the wafer inspection equipment is a scanning electron microscope or an optical inspection instrument, and the reference image is a gray level image.

* * * * *